US008625899B2

(12) United States Patent
Kim et al.

(10) Patent No.: US 8,625,899 B2
(45) Date of Patent: Jan. 7, 2014

(54) METHOD FOR RECOGNIZING AND TRANSLATING CHARACTERS IN CAMERA-BASED IMAGE

(75) Inventors: Sang-Ho Kim, Suwon-si (KR); Seong-Taek Hwang, Pyeongtaek-si (KR); Sang-Wook Oh, Ansan-si (KR); Hyun-Soo Kim, Yongin-si (KR); Jung-Rim Kim, Suwon-si (KR); Ji-Hoon Kim, Seoul (KR); Dong-Chang Lee, Daegu (KR); Yun-Je Oh, Seongnam-si (KR); Hee-Won Jung, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 1123 days.

(21) Appl. No.: 12/500,094

(22) Filed: Jul. 9, 2009

(65) Prior Publication Data
US 2010/0008582 A1 Jan. 14, 2010

(30) Foreign Application Priority Data

Jul. 10, 2008 (KR) .......................... 10-2008-0067098
Jun. 25, 2009 (KR) .......................... 10-2009-0057266

(51) Int. Cl.
*G06K 9/18* (2006.01)
(52) U.S. Cl.
USPC ......................................................... 382/185
(58) Field of Classification Search
USPC ................................................. 382/177, 185
See application file for complete search history.

(56) References Cited

U.S. PATENT DOCUMENTS

| 5,917,944 | A * | 6/1999 | Wakisaka et al. ............. 382/190 |
| 6,374,210 | B1 | 4/2002 | Chu |
| 7,280,138 | B2 * | 10/2007 | Shibutani ....................... 348/239 |
| 2001/0056342 | A1 * | 12/2001 | Piehn et al. ........................ 704/3 |
| 2003/0164819 | A1 * | 9/2003 | Waibel ........................... 345/173 |
| 2004/0210444 | A1 * | 10/2004 | Arenburg et al. .............. 704/277 |
| 2005/0116945 | A1 * | 6/2005 | Mochizuki et al. ............ 345/418 |
| 2005/0221856 | A1 * | 10/2005 | Hirano et al. .................. 455/557 |
| 2007/0104376 | A1 * | 5/2007 | Jung et al. ...................... 382/229 |
| 2007/0179773 | A1 * | 8/2007 | Shibutani ........................... 704/2 |
| 2007/0225964 | A1 * | 9/2007 | Wu et al. ............................ 704/2 |

FOREIGN PATENT DOCUMENTS

| CN | 1328672 | 12/2001 | |
| CN | 1606030 | 4/2005 | |
| CN | 1606030 A * | 4/2005 | ............... G06K 9/90 |

* cited by examiner

*Primary Examiner* — Jingge Wu
(74) *Attorney, Agent, or Firm* — The Farrell Law Firm, P.C.

(57) ABSTRACT

A method for recognizing an image photographed by a camera and translating characters in connection with an electronic dictionary is provided. The method includes directly selecting an area to be recognized from the photographed character image and performing character recognition, translating and recognizing characters of a user's selected word in connection with dictionary data, and displaying translation result information of user's selected character or word in connection with dictionary data on a screen device. The recognition includes providing information on location of the selected character image area and location of the recognized character string words to the user, and then translating a character string or word in a location area selected by the user. The electronic dictionary-connected search and translation is for searching the character or word selected in connection with the electronic dictionary database, and providing translation result to the user.

17 Claims, 27 Drawing Sheets

| INFORMATION ON INDIVIDUAL CHARACTER CODE | INFORMATION ON INDIVIDUAL CHARACTER LOCATION |
|---|---|

CONSTRUCTION OF RECOGNIZED INDIVIDUAL CHARACTER DATA

| SET OF INDIVIDUAL CHARACTER CODE INFORMATION | SET OF INDIVIDUAL CHARACTER LOCATION INFORMATION |
|---|---|

CONSTRUCTION OF RECOGNIZED INDIVIDUAL WORD DATA

| SET OF INDIVIDUAL WORD CODE INFORMATION | SET OF INDIVIDUAL WORD LOCATION INFORMATION |
|---|---|

CONSTRUCTION OF RECOGNIZED INDIVIDUAL LINE DATA

| SET OF INDIVIDUAL LINE CODE INFORMATION | SET OF INDIVIDUAL LINE LOCATION INFORMATION |
|---|---|

CONSTRUCTION OF RECOGNIZED INDIVIDUAL BLOCK DATA

| SET OF INDIVIDUAL BLOCK CODE INFORMATION | SET OF INDIVIDUAL BLOCK LOCATION INFORMATION |
|---|---|

CONSTRUCTION OF RECOGNIZED CHARACTER IMAGE ENTIRE DATA

FIG.9A

| CODE INFORMATION OF RECOGNIZED WORD 1 | LOCATION INFORMATION OF RECOGNIZED WORD 1 |
|---|---|
| CODE INFORMATION OF INDIVIDUAL CHARACTER 1 | LOCATION INFORMATION OF INDIVIDUAL CHARACTER 1 |
| CODE INFORMATION OF INDIVIDUAL CHARACTER 2 | LOCATION INFORMATION OF INDIVIDUAL CHARACTER 2 |
| ... | ... |
| CODE INFORMATION OF INDIVIDUAL CHARACTER n | LOCATION INFORMATION OF INDIVIDUAL CHARACTER n |

| CODE INFORMATION OF RECOGNIZED WORD 2 | LOCATION INFORMATION OF RECOGNIZED WORD 2 |
|---|---|
| CODE INFORMATION OF INDIVIDUAL CHARACTER 1 | LOCATION INFORMATION OF INDIVIDUAL CHARACTER 1 |
| CODE INFORMATION OF INDIVIDUAL CHARACTER 2 | LOCATION INFORMATION OF INDIVIDUAL CHARACTER 2 |
| ... | ... |
| CODE INFORMATION OF INDIVIDUAL CHARACTER n | LOCATION INFORMATION OF INDIVIDUAL CHARACTER n |

...

| CODE INFORMATION OF RECOGNIZED WORD n | LOCATION INFORMATION OF RECOGNIZED WORD n |
|---|---|
| CODE INFORMATION OF INDIVIDUAL CHARACTER 1 | LOCATION INFORMATION OF INDIVIDUAL CHARACTER 1 |
| CODE INFORMATION OF INDIVIDUAL CHARACTER 2 | LOCATION INFORMATION OF INDIVIDUAL CHARACTER 2 |
| ... | ... |
| CODE INFORMATION OF INDIVIDUAL CHARACTER n | LOCATION INFORMATION OF INDIVIDUAL CHARACTER n |

| CODE INFORMATION OF RECOGNIZED LINE 1 | LOCATION INFORMATION OF RECOGNIZED LINE 1 |
|---|---|
| CODE INFORMATION OF INDIVIDUAL WORD 1 | LOCATION INFORMATION OF INDIVIDUAL WORD 1 |
| CODE INFORMATION OF INDIVIDUAL WORD 2 | LOCATION INFORMATION OF INDIVIDUAL WORD 2 |
| ... | ... |
| CODE INFORMATION OF INDIVIDUAL WORD n | LOCATION INFORMATION OF INDIVIDUAL WORD n |

| CODE INFORMATION OF RECOGNIZED LINE 2 | LOCATION INFORMATION OF RECOGNIZED LINE 2 |
|---|---|
| CODE INFORMATION OF INDIVIDUAL WORD 1 | LOCATION INFORMATION OF INDIVIDUAL WORD 1 |
| CODE INFORMATION OF INDIVIDUAL WORD 2 | LOCATION INFORMATION OF INDIVIDUAL WORD 2 |
| ... | ... |
| CODE INFORMATION OF INDIVIDUAL WORD n | LOCATION INFORMATION OF INDIVIDUAL WORD n |

...

| CODE INFORMATION OF RECOGNIZED LINE n | LOCATION INFORMATION OF RECOGNIZED LINE n |
|---|---|
| CODE INFORMATION OF INDIVIDUAL WORD 1 | LOCATION INFORMATION OF INDIVIDUAL WORD 1 |
| CODE INFORMATION OF INDIVIDUAL WORD 2 | LOCATION INFORMATION OF INDIVIDUAL WORD 2 |
| ... | ... |
| CODE INFORMATION OF INDIVIDUAL WORD n | LOCATION INFORMATION OF INDIVIDUAL WORD n |

FIG.9B

| CODE INFORMATION OF RECOGNIZED BLOCK 1 | LOCATION INFORMATION OF RECOGNIZED BLOCK 1 |
|---|---|
| CODE INFORMATION OF INDIVIDUAL LINE 1 | LOCATION INFORMATION OF INDIVIDUAL LINE 1 |
| CODE INFORMATION OF INDIVIDUAL LINE 2 | LOCATION INFORMATION OF INDIVIDUAL LINE 2 |
| ... | ... |
| CODE INFORMATION OF INDIVIDUAL LINE n | LOCATION INFORMATION OF INDIVIDUAL LINE n |

| CODE INFORMATION OF RECOGNIZED BLOCK 2 | LOCATION INFORMATION OF RECOGNIZED BLOCK 2 |
|---|---|
| CODE INFORMATION OF INDIVIDUAL LINE 1 | LOCATION INFORMATION OF INDIVIDUAL LINE 1 |
| CODE INFORMATION OF INDIVIDUAL LINE 2 | LOCATION INFORMATION OF INDIVIDUAL LINE 2 |
| ... | ... |
| CODE INFORMATION OF INDIVIDUAL LINE n | LOCATION INFORMATION OF INDIVIDUAL LINE n |

⋮

| CODE INFORMATION OF RECOGNIZED BLOCK n | LOCATION INFORMATION OF RECOGNIZED BLOCK n |
|---|---|
| CODE INFORMATION OF INDIVIDUAL LINE 1 | LOCATION INFORMATION OF INDIVIDUAL LINE 1 |
| CODE INFORMATION OF INDIVIDUAL LINE 2 | LOCATION INFORMATION OF INDIVIDUAL LINE 2 |
| ... | ... |
| CODE INFORMATION OF INDIVIDUAL LINE n | LOCATION INFORMATION OF INDIVIDUAL LINE n |

FIG.20A 定"魔鬼赛程",或者模
　　　　 1　2 3 4 5　　6 7 8
FIG.20B 定　魔鬼赛程　　或者模
　　　　 1　2 3 4 5　　6 7 8
FIG.20C 定　魔鬼赛程　　或者模
　　　　 1　2 2　4 5　　6 7 8
FIG.20D 定　魔鬼赛程　　或者模
　　　　 1　2 2 3 3　　6 7 8
FIG.20E 定　魔鬼赛程　或者模
　　　　 1　2 2 3 3　4 4 8
FIG.20F 定　魔鬼赛程　或者模
　　　　 1　2 2 3 3　4 4 5
FIG.20G 定　魔鬼 赛程 　或者模
　　　　 1　2 2 3 3　4 4 5

METHOD FOR RECOGNIZING AND TRANSLATING CHARACTERS IN CAMERA-BASED IMAGE

PRIORITY

This application claims priority under 35 U.S.C. §119(a) to two Korean Patent Applications entitled "Method for Recognizing and Translating Characters in Camera-Based Image" filed in the Korean Intellectual Property Office on Jul. 10, 2008 and Jun. 25, 2009 and assigned Ser. Nos. 10-2008-0067098 and 10-2009-0057266, respectively, the contents of which are incorporated herein by reference.

BACKGROUND OF THE INVENTION

1. Field of the Invention

The present invention relates to character recognition, and more particularly to a method for recognizing characters included in an image photographed by a camera and translating the recognized characters in connection with a dictionary.

2. Description of the Related Art

Conventional character recognition usually involves a method in which the contents of a paper document are scanned by a scanner and the form of the scanned contents is then changed to that of a text file or an electronic document. However, a method has recently been proposed for recognizing characters in an image photographed by a portable digital device that includes a small digital camera mounted thereon.

Conventional scanners are limited to recognizing characters written on paper. On the other hand, a portable digital device, on which a digital camera is mounted, is capable of Optical Character Recognition (OCR) using the camera. Namely, a character recognition method using a camera mounted on a portable digital device can recognize characters represented on each of various mediums (e.g., a monument, a road guide signboard, a menu board, and various explanatory notes).

However, in using the camera for character recognition, as described above, there is no limitation on characters to be recognized. Accordingly, there may occur a case where it is impossible to recognize characters due to not only the diversity of the characters to be recognized but also external factors (e.g., lighting around the characters to be recognized).

FIG. 1 is a flowchart showing a character recognition method for recognizing characters in a photographed image according to the prior art. Referring to FIG. 1, the conventional character recognition method 100 includes photographing an image including characters by a camera in step S1, processing data of the photographed image in step S2, an interface step S3, normalizing each of the characters in step S4, extracting a feature of each normalized character in step S5, recognizing a character and a word based on the extracted feature of each character in step S6, and providing a translation result in step S7.

More specifically, step S1 includes the characters to be recognized, and obtaining an image representing the subject. Step S2 corresponds to converting the photographed image to a gray scale image. The photographed image may be a color image including various colors. However, for character recognition, it is necessary to remove unnecessary colors from the photographed image and convert the photographed image to a gray scale image.

Step S3 corresponds to compensating for the photographed image in order to have a form suitable for the character recognition according to both the characteristics of the camera used for photographing the image and an environment where the image has been photographed.

Also, step S4 corresponds to converting each character (e.g. a consonant and vowel in Hangeul and each letter in the English alphabet, on a minimum basis) to be recognized, which is included in the photographed image, to a character having the form of a predetermined standard. Step S5 corresponds to extracting a feature of each character to be recognized.

Step S6 corresponds to recognizing an objective character (i.e., defining a photographed character) based on the feature of each extracted character. Step S7 corresponds to combining the recognized characters into words and providing the combination result to the user.

The conventional method further includes a user interface step, in which stored result data of recognized characters from step S6 is stored inside of the device, the recognized characters or words are output on a screen device, and then the words selected by a user's selecting means are searched in connection with an electronic DataBase (DB) and are output again on the screen.

In the conventional character recognition method described above, particularly, with respect to recognition and dictionary translation of a character image, a user interface capable of recognizing both characters included in a character image and actually recognized characters is cumbersome. During recognition on the entire character image, the recognition ratio is typically low due to restrictive hardware performance and inclusion of various noises, and herein, a user interface also may be cumbersome.

SUMMARY OF THE INVENTION

Accordingly, the present invention has been made to solve the above-mentioned problems occurring in the prior art, and the present invention provides a method for recognizing characters, which improves the accuracy of character recognition, and can recognize various characters and simultaneously, improves the convenience of a user interface, in an apparatus capable of recognizing characters in an image photographed by a camera.

In accordance with an aspect of the present invention, a method for recognizing and translating characters in an image photographed by a camera is provided. The method includes recognizing characters and words included in the photographed image, and translating a word or characters selected by a user based on data in a dictionary, which is associated with the selected word; and providing the recognized characters and words to the user and directing translation of the selected characters or word, which corresponds to a user interface process, wherein recognizing the characters and words includes translating the characters or word selected in the user interface process, and provides the translated characters or word to the user through the user interface process.

BRIEF DESCRIPTION OF THE DRAWINGS

The above and other features, aspects, and advantages of the present invention will be more apparent from the following detailed description taken in conjunction with the accompanying drawings, in which:

FIGS. 6A and 6B, 7A to 7D, 8A to 8D, and 9A to 9C are illustrative views illustrating examples of a method for recognizing characters according to the present invention;

FIGS. 9A to 9C are block diagrams illustrating specific examples of a storing method of the entire recognition data stored after recognition of the character image;

FIGS. 10A to 10B and 11A to 11B are views illustrating an example of a character image processed according to the character recognition step shown in to FIG. 3;

FIGS. 19A to 19B and 20A to 20G are views illustrating an example of a method for selecting a search word;

DETAILED DESCRIPTION OF EMBODIMENTS OF THE INVENTION

Hereinafter, embodiments of the present invention will be described in detail with reference to the accompanying drawings. In the following description, a detailed description of functions known to the public, which is related to the present invention, or a configuration according to the present invention will be omitted to avoid making the subject matter of the present invention unclear.

The present invention provides a method for recognizing characters included in a photographed image. The method for recognizing characters included in the image photographed by a camera according to the present invention includes a character and word recognition and translation step and a user interface step. Herein, the character and word recognition and translation step includes recognizing characters and words included in the photographed image, and translating a word selected by a user based on data in a dictionary, which is connected with the selected word. The user interface step provides, to the user, the characters and words that have been recognized in the character and word recognition and translation step and directs the translation of characters or the word selected by the user. The character and word recognition and translation step includes translating the characters or word selected in the user interface step and providing the translated characters or word to the user through the user interface step.

In describing the method for recognizing characters according to the present invention, the method may be classified into a method in which the entire photographed image is designated as an object of character recognition, and a method in which only a partial range of the photographed image is designated as an object of character recognition. The user interface step as described above includes multiple steps, which are required for provision to the user or the user's selections during the character and word recognition and translation step.

Figure 1:
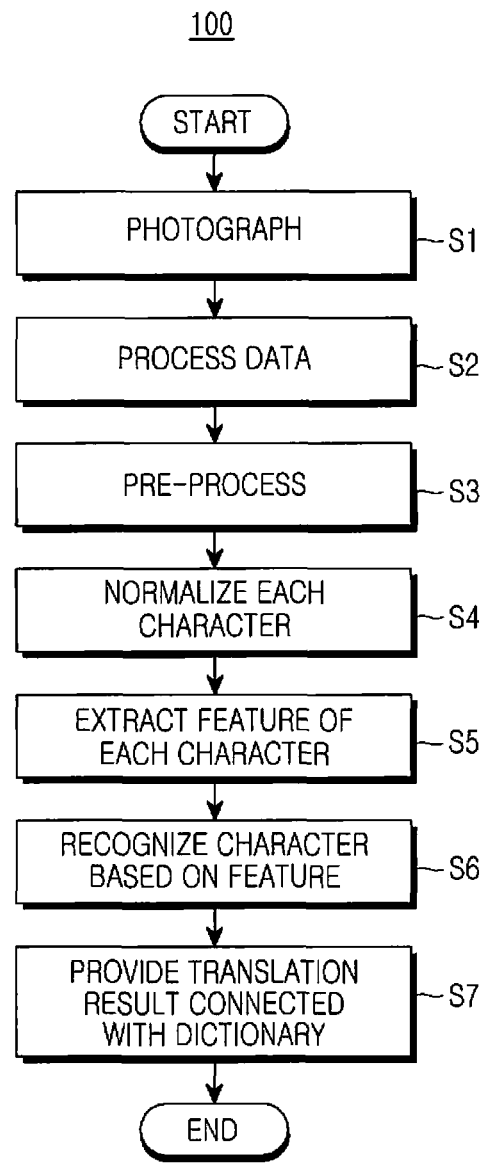
FIG. 1 is a flowchart illustrating a method for recognizing characters according to the prior art.
Figure 2:
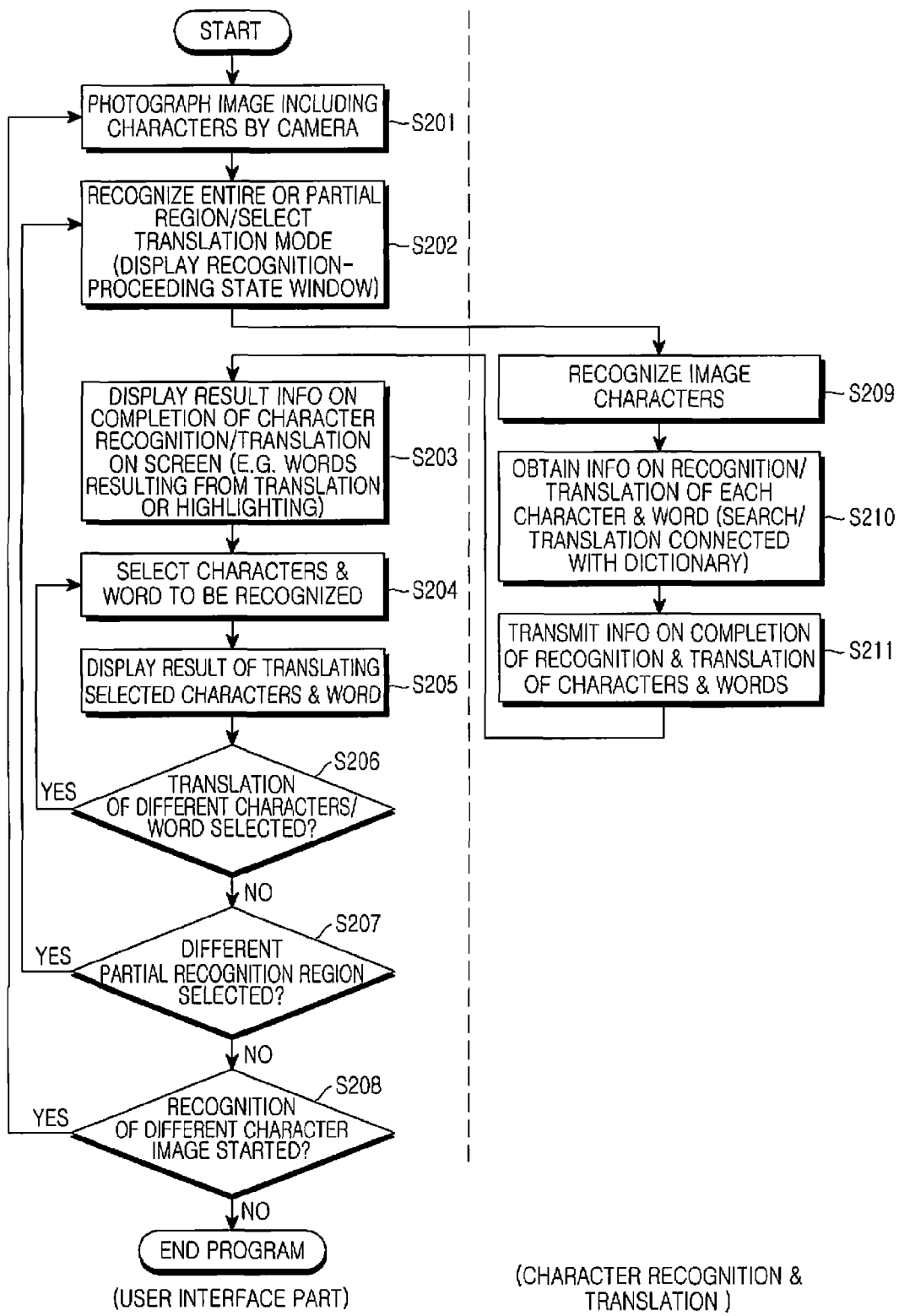
FIG. 2 is a flowchart illustrating a method for recognizing characters according to a first embodiment of the present invention.

FIG. 2 is a flowchart illustrating a method for recognizing characters according to a first embodiment of the present invention. FIG. 2 further illustrates an embodiment of the present invention in which an entire photographed image is designated as the object of the character recognition. Referring to FIG. 2, the method for recognizing characters in the image photographed by the camera according to the present invention includes the character and word recognition step and the user interface step. Herein, the character and word recognition step includes recognizing characters and words included in the photographed image and comparing each of the recognized words with data in a dictionary, which is connected with each of the recognized words. The user interface step includes providing the characters and words, which have been recognized in the character and word recognition step, to the user, and directing the character and word recognition step according to the user's selection.

The user interface steps include photographing an image in step S201, selecting a recognition range of the photographed image for recognizing characters included in the photographed image in step S202, providing a result of the recognition or translation to the user in steps S203 through S205, checking with the user if the user selects characters or a word other than the characters or word that the user have/has selected in step S6 and returning to steps S203 to S205 when the user selects characters or a word, and determining the user desires returning to step S201 when the user does not select characters or a word in step S207.

When the user selects the entire photographed image as the object of the character recognition in step S202, the character and word recognition step S209 is performed.

The character and word recognition steps include recognizing each of the characters included in the photographed image in step S209, constructing a word from each recognized character, and searching a dictionary for data connected with the constructed word and checking the meaning of the constructed word in the dictionary in step S210, and in step S211, providing the checked word or recognized characters (i.e., a result of completing the recognition or translation) to the user through step S203.

Figure 3:
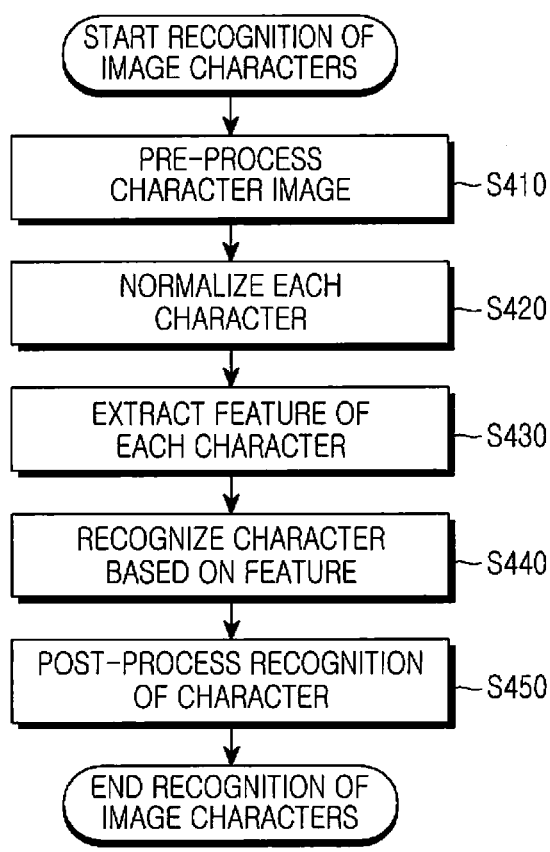
FIG. 3 is a flowchart illustrating a character recognition step shown in FIG. 2.

FIG. 3 is a flowchart further illustrating step S209 as shown in FIG. 2. Referring to FIG. 3, the character recognition step S209 includes pre-processing for removing the noise of the corresponding character image and binarizing the image in step S410, separating and normalizing individual words in step S420, extracting a feature of each character in step S430; a feature-based character recognizing step S440, in which the extracted feature of each character is compared with data on the previously stored features of characters, and the highest priority information (the most matching result obtained through the comparison with the previously stored data on features of the respective characters) is output, and a post-processing step S450 for separating and storing the recognized character recognition results.

Figure 4:
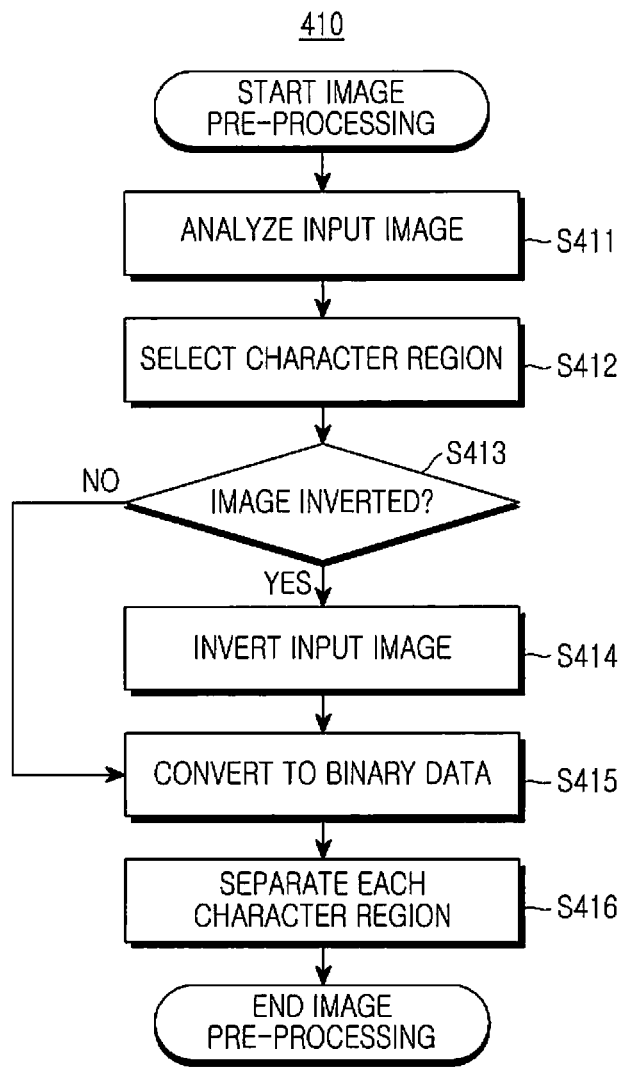
FIG. 4 is a flowchart illustrating a pre-processing step shown in FIG. 3.

FIG. 4 is a flowchart further illustrating step S410 as shown in FIG. 3. Referring to FIG. 4, the pre-processing step S410 includes analyzing an input image in step S411, selecting a character region in an image to be analyzed in step S412, determining whether the brightness of each of the character region and a background region included in the image is inverted in step S413, inverting the brightness of each of the character region and the background region, converting data of the character region of the image, which has gone through step 413 or 414, to binary data in step S415, and separating the character region, the data of which has been converted to the binary data, from the image in step S416.

In the pre-processing step S410, the image is analyzed by using a histogram, etc., of the image photographed in the user interface step, and distinguishes between the character region and background region. Then, in the pre-processing step S410 multiple steps are performed to determine whether each of the character region and background region is inverted based on hue values (e.g., brightness values).

Figure 5:
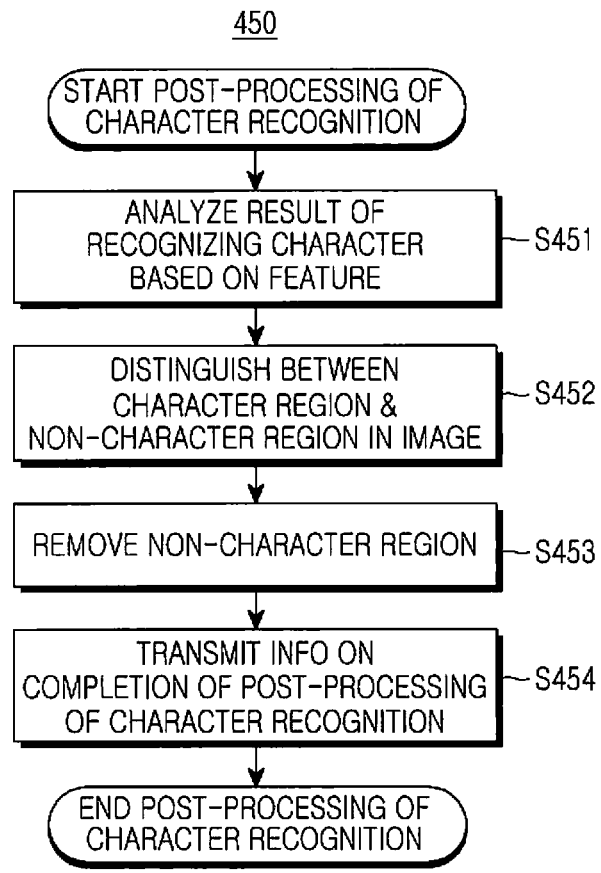
FIG. 5 is a flowchart illustrating a post-processing step shown in FIG. 3.

FIG. 5 is a flowchart illustrating the post-processing step S450 shown in FIG. 3. Referring to FIG. 5, the post-processing step S450 includes analyzing the recognition result of a character or a word based on the extracted feature of each character in step S451, distinguishing between a character region and a background region in the photographed image in step S452, removing the background region other than the character region in step S453, and generating, in step S454, information for reporting the completion of step S450.

The post-processing step S450 is performed in order to correct an error due to incorrect character recognition or noise interference. Accordingly, the post-processing step S450 includes determining whether the recognized characters include a non-character, which has been incorrectly recognized as a character, and then corrects the error.

Figure 6A:
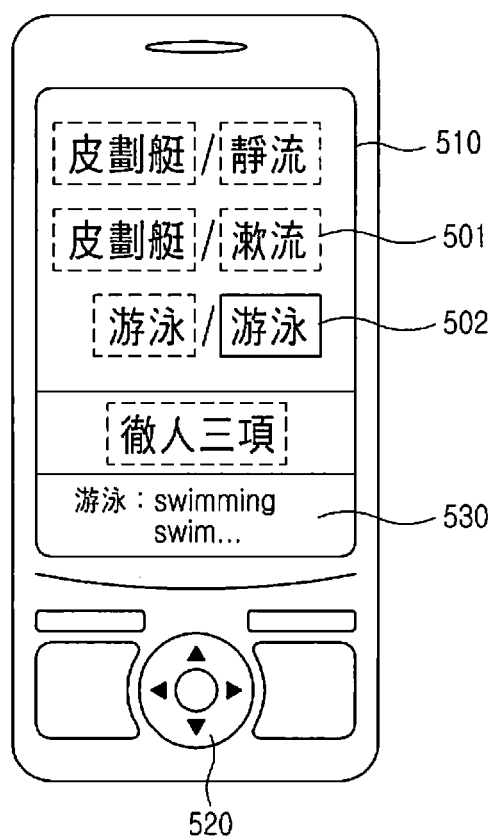
Figure 6B:
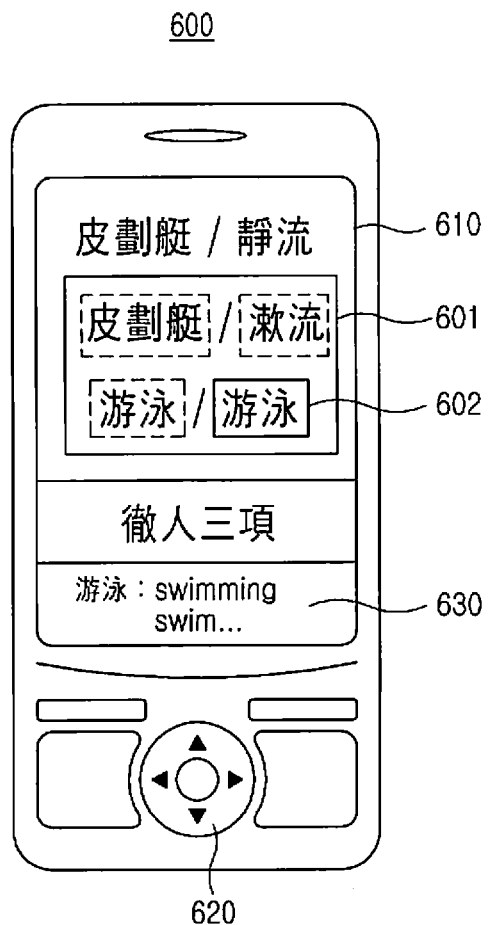

FIGS. 6A and 6B are illustrative views illustrating implementation examples of the method for recognizing characters according to the present invention. FIG. 6A illustrates an example for implementing the character recognition method in an apparatus including a touch-screen 510. Specifically, FIG. 6A illustrates an example of the character recognition method according to the present invention, in which the entire photographed image is designated as an object of character recognition. In the example of FIG. 6A, both a non-selected character 501 and a selected character 502 have already been processed as the object of character recognition. A result of recognizing and translating the selected character 502 is provided to a user.

Although the example of FIG. 6A is implemented by using the touch-screen 510, a user may alternatively select a particular character or word by using a navigation key 520, etc. FIG. 6B illustrates another example of selecting a partial range 601 of a photographed image 610 as an object of the character recognition. A recognition result of a character or word that the user has selected in the selected range 601 is provided to the user.

Figure 7A:
Figure 7B:
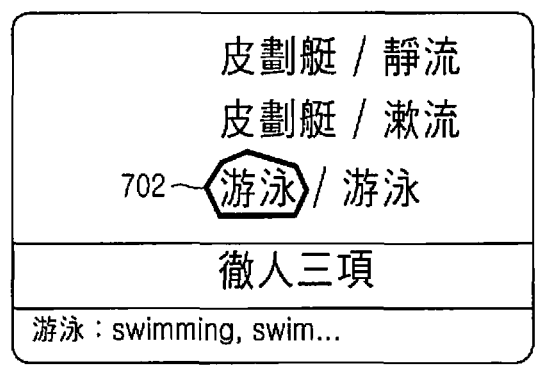
Figure 7C:
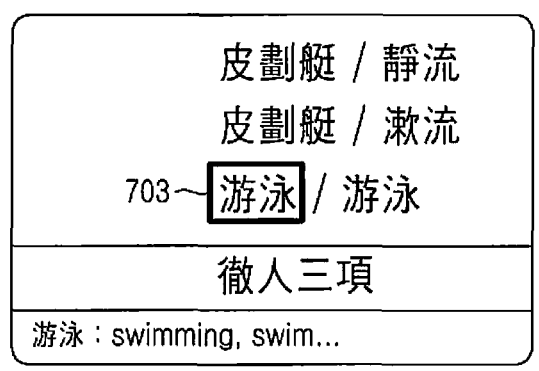
Figure 7D:
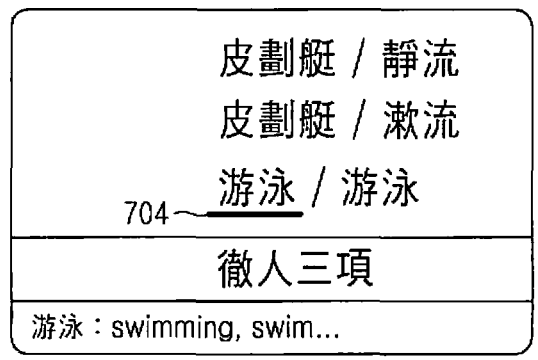

FIGS. 7A to 7D are illustrative views showing implementation examples of the method for recognizing characters according to the present invention. The implementation examples of FIGS. 7A to 7D are for implementing a range for designating an object of the character recognition or a method for selecting recognized characters and word. Each of the examples shown in FIGS. 7A to 7D is implemented by using a touch-screen, and can thus be implemented by using a separate touch pen or a part of the user's body. FIG. 7A shows an embodiment in the form of drawing an oblique line 701 on a word to be selected. As shown in FIG. 7B a user may draw a line 702 having no predetermined shape around a word to be selected. Alternatively, as shown in FIG. 7C, a user may draw a box-shaped line 703 around a word to be selected. As shown in FIG. 7D, a user may draw an underline 704 underneath a word to be selected.

FIGS. 9A to 9C are illustrative views of still another example of the method for recognizing characters in a photographed image according to the present invention. In the example of FIGS. 9A to 9C, only a partial range of the photographed image is designated as an object of the character recognition. FIG. 9C is still another example of a screen, the entirety of which is used to create the translation result shown in FIG. 8D.

According to the present invention, a user may selecting a partial range or the entire range of a photographed image. Further, an input means such as a touch-screen or a navigation key may be used in selecting recognized or translated characters and words.

The present invention provides a method of recognizing characters included in a photographed image, constructing a word from a recognized character string, and translating the words. Herein, the method of recognizing characters included in a character image photographed by a camera provides an interface, which is for recognizing/translating characters included in the photographed image and a word including a character string and providing the corresponding location information to a user via a screen, or it can be used for translating a word existing on a user's selected location on the screen in connection with a DB of an electronic dictionary and instinctively providing the result to the user.

Figure 8:
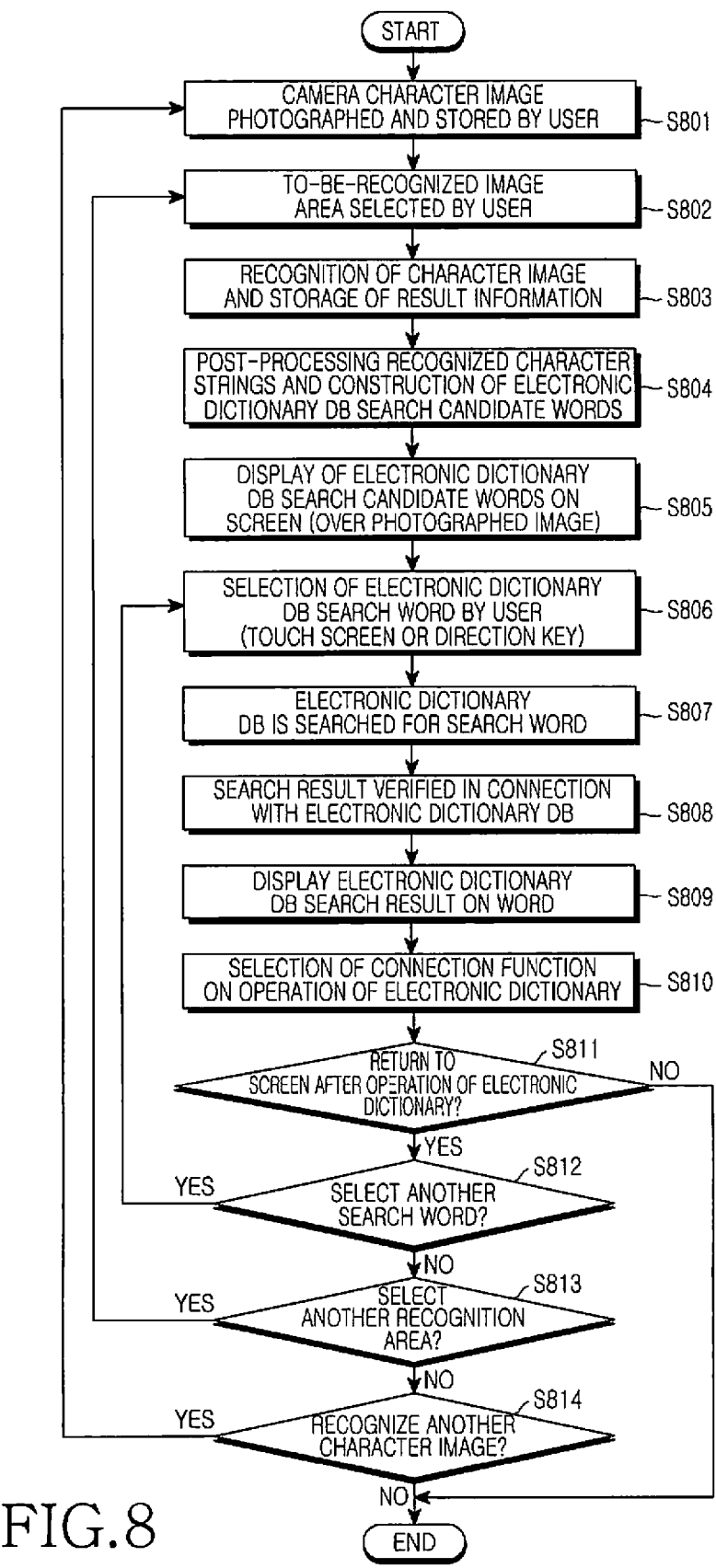
FIG. 8 is a flow chart illustrating a method for recognizing and translating characters, according to a second embodiment of the present invention.
Figure 16:
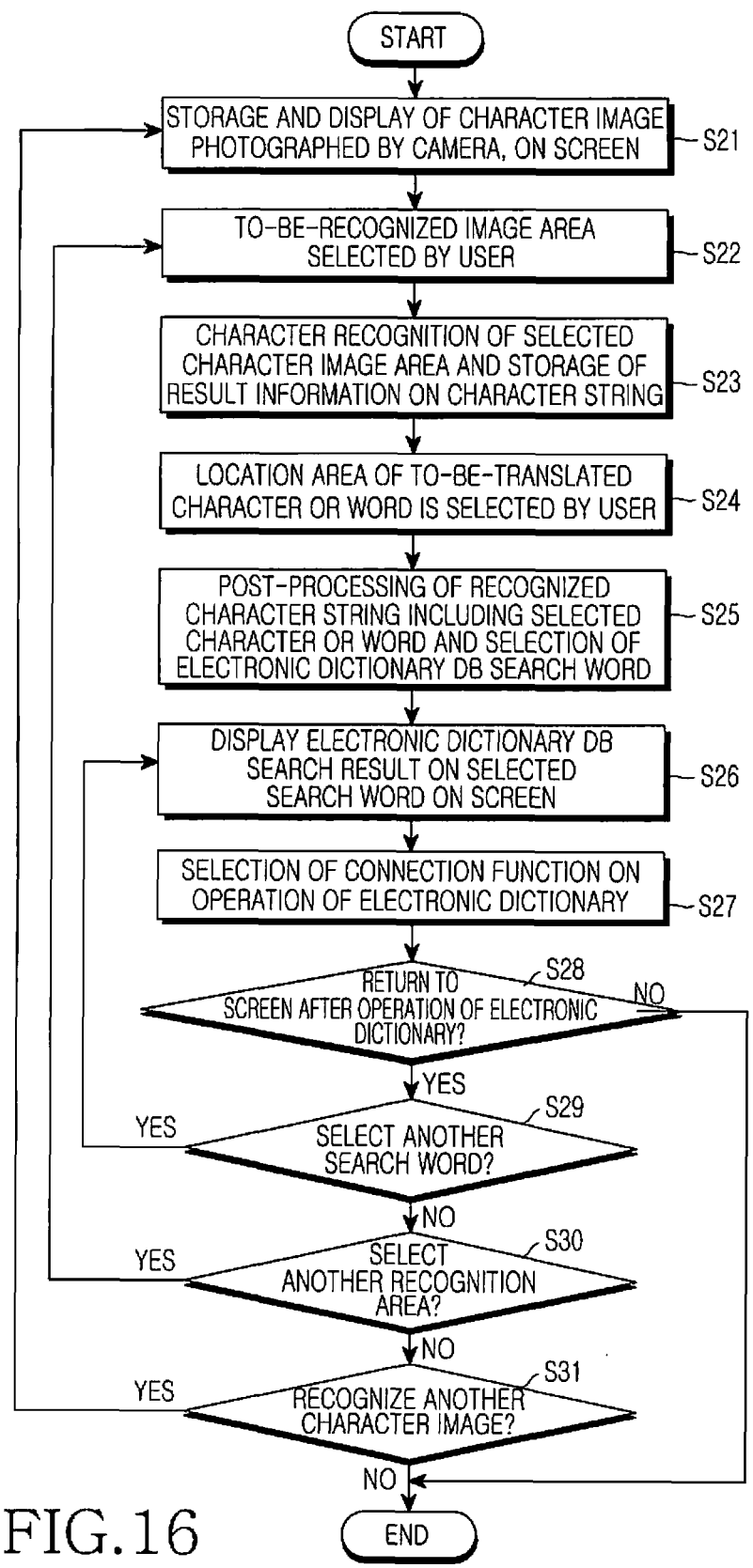
FIG. 16 is a flow chart illustrating a method for recognizing and translating a character image, according to a third embodiment of the present invention.

FIG. 8 is a flow chart illustrating a method for recognizing and translating characters, according to a second embodiment of the present invention, and FIG. 16 is a flow chart illustrating a method for recognizing and translating characters, according to a third embodiment of the present invention. The second and third embodiments of the present invention are summed up into two characteristics.

First, in a recognition step of a photographed character image, when a user directly selects an area to be character-recognized, the location area information of an individual character-recognized character or word is directly displayed on a screen providing the character image. Then, when the user finally selects a character string of a specific word, to be translated, the corresponding word is translated by using an electronic dictionary built in a portable terminal and the result is instinctively provided to the user.

Second, in some languages having no spacing between words, such as Chinese or Japanese, unlike English, characters included in a photographed image are character-recognized, and are translated by using a DB of a built-in electronic dictionary. For a character string having no spacing between words, there are some techniques for spacing or separating words.

Referring to FIG. 8, a method for recognizing and translating characters included in a photographed character image, according to a second embodiment of the present invention, is described as follows.

In step S801, a camera character image is photographed and stored by a user. In step S802 the user selects an area to be recognized in the photographed image. In step S803, character-recognizing and storing of the recognized characters included in the selected area is performed. In step S804, post-processing of recognized character strings and construction of an electronic dictionary database search candidate words is performed. In step S805, recognized characters and words are provided as selectable items to the user. In step S806, the user selects an object to be translated from among selectable characters or words provided from step S805. In step S807, a search for the selected characters or word is performed. In step S808, verification of the searched characters or word is performed. In step S809, the translation result of the characters or word verified in step S808 is provided to the user. In step S810, selection of a connection function reliant to an operation of an electronic dictionary is performed. In step S811, it is determined whether to return to a screen providing the translation result. In step S812, if the method does not return to the screen providing a translation result, another word to be translated is selected. In step S813, another area to be recognized in the character image is selected, if another word to be translated is not selected in step S812; In step S814, it is determined whether to recognize another character image, if another unrecognized area in the character image is not selected in step S813, wherein in step S810 for operating the electronic dictionary after step S809, a means with which a user can directly operate the electronic dictionary is provided to the user via the screen, and then when the operating means is selected, the operating state of the electronic dictionary is displayed on the screen.

In step S802, a user directly selects an area to be recognized in a character image provided via a screen included in a portable terminal, or the like, and the location information of the selected area is displayed over the character image provided via the screen so that the user can easily recognize the information via the screen. In step S802, the user can select the area to be recognized by using the drag of a touch screen or a pointing device, such as a mouse.

In step S803, the characters included in the character image displayed on the screen are recognized and the result is stored, so as to store and output individual recognized characters as a type of digital character data. Herein, the characters included in the area in the character image, which is selected by the user, are recognized, thereby increasing the character recognition ratio and reducing the time necessary for recognition.

In step S805, location information of all words including the recognized characters is directly provided over the character image provided via the screen. Herein, the characters and words recognized in step S803 are overlapped onto the image displayed on the screen while the screen provides the character image in the state before the recognition. A colorful square wrapping the characters and words recognized in step S803 is provided so as to allow the user to select the recognized characters or words. Also, when the user selects a part of the entire character image, the location information on words or characters included in the area selected by the user is provided as described above.

In step S806, the user selects an object to be translated from among selectable characters or words provided from step S805. Herein, from among the words showing their location information on the character image provided via the screen, the user highlights the location information of a word or a character string, located most closely to the location he wants to select, so as to separate the character from other unselected words or character strings. In other words, in step S806, a distance from the middle point between the start point and the end point of a word or a character string, to the location selected by the user is calculated, and thus the location of a word or a character string, located most closely to the location selected by the user, is determined. Also, the location information (the word or character string selected by the user, or a word or character string adjacent to the word or character string selected by the user) is set to have a different color or thickness from unselected words or characters, so that the location of the word or character string, determined to be selected by the user, can be more easily recognized by the user, compared to other neighboring words or character strings.

Figure 23:
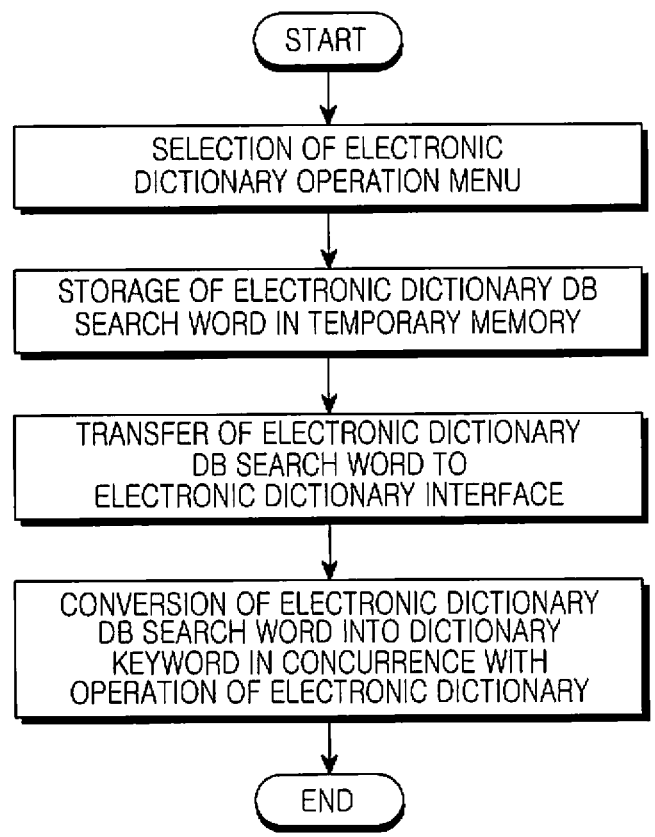
FIG. 23 is a flow chart illustrating a method for connecting with the electronic dictionary built in the portable terminal shown in FIG. 22.

In step S807, the word or character string at the location selected by the user is set as a search word, and is searched in connection with the DB of the electronic dictionary, and then the result is verified. FIG. 23 is a flow chart illustrating a method for post-processing a character string and constructing candidate words to be searched in connection with an electronic dictionary DB, according to a second embodiment of the present invention. Referring to FIG. 23, if an object to be applied to step S807 is a language having no spaces between words such as Chinese or Japanese, step S807 may include character-recognizing the character image and loading all stored data of character strings, filtering out numbers or special characters included in the loaded character strings, comparing the character strings, after the filtering process, with the electronic dictionary, and separating searched words, searching for some words from among the separated words, which are directly selected by the user via the screen, in connection with the electronic dictionary. Step S807 includes searching for words including recognized characters, based on the electronic dictionary, and comparing entry words or keywords included in a list of the searched words, with each other, to verify translated contents.

Figure 10A:
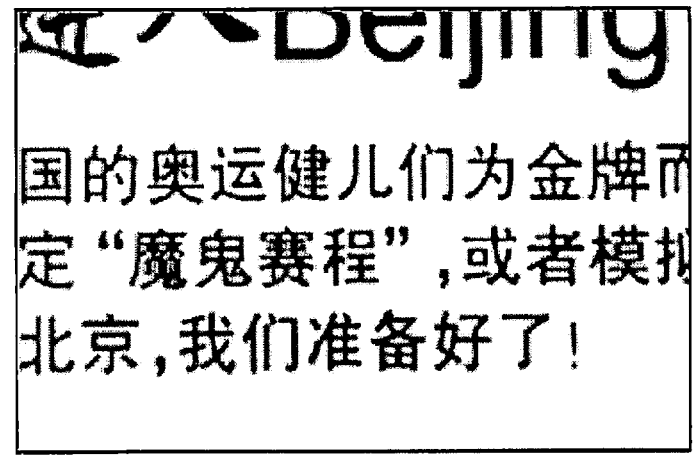
Figure 10B:
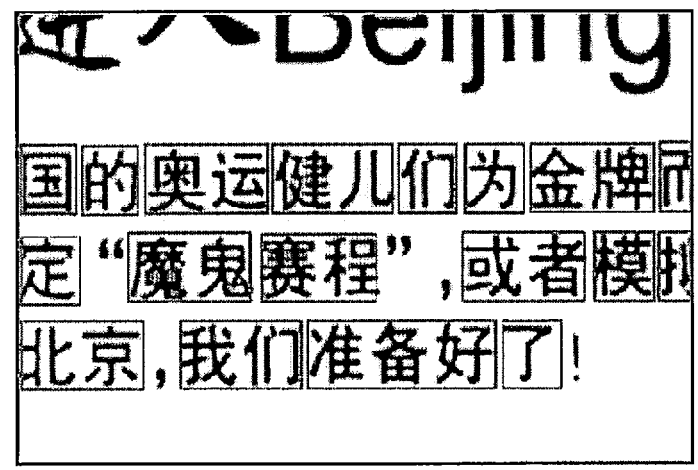

FIGS. 10A to 10B and FIGS. 11A to 11B are for illustrating specific examples according to FIG. 3. FIGS. 10A and 10B illustrate an actual photographed and recognized character image, and location information of candidate search words of the electronic dictionary DB, which is overlapped on the character image and is wrapped by a square. FIGS. 11A to 11B are views for schematically illustrating the processes of FIGS. 10A and 10B, in which the post-processing on initially recognized individual characters and character strings and the construction of the final candidate search words of the electronic dictionary are sequentially carried out.

FIG. 10A shows the character image displayed on the screen, and FIG. 10B shows the location information of the words constructed through the post-processing of character recognition, which is displayed over the character image. FIG. 11A shows data of individual characters obtained from character image recognition, FIG. 11B shows the state where the recognized characters are post-processed by using a word database, and FIG. 11B shows the state where the construction of words is completed after the removal of special characters and symbols.

In step S809, for the electronic dictionary database search word at the location selected by the user, on the character image displayed on the screen, a dictionary entry word or a keyword searched from the electronic dictionary database, and corresponding meanings are directly provided to the user. Herein, the translation results are provided in a semi-transparent type allowing other image information to be shown to the user. Further, if the search result overlaps a previous search result, the search result is provided to the user via the screen in such a manner that it does not overlap the previous search result.

The method for recognizing and translating a character image, according to the present embodiment, is largely divided into constructing the display of the screen in such a manner that the user can selectively select an area to be recognized, displaying relative location information of the recognized corresponding character string or words the recognized character image displayed on the screen device, from among character-recognized result data information, in such a manner that the user can easily distinguish the information from the previous information, and selecting a word from among the distinguished words by the user, searching the electronic dictionary for the selected word, and instinctively providing the result of the translation to the user.

FIGS. 9A to 9C illustrate a configuration of entire recognition data stored after recognition of a character image. FIGS. 9A to 9C sequentially show, as a result of the character image recognition, individually recognized characters, individual words including the individual characters, the structure of individual character strings including the individual words, and a block including the character strings. In general, in a case of English character recognition, for a character string having spaces between individual words, the spaces between the words are also recognized, and thus in the output result, the user can directly recognize individual words. However, the character image recognition of some languages with a character string having no spaces between words, such as Chinese or Japanese, further requires a step of separating individual words (which will be further described later). In solving the above described problem, the following methods are used.

In a first method, individual characters of the character image are recognized, and then for a sentence of a character string written in the corresponding country's language, words of individual meaning components are separated (a morpheme analysis method).

In a second method, individual characters are recognized, and then for a sentence of the recognized character strings, individual words are separated by separately using a large-scale word list database of a corresponding language. However, the above described methods further require the use of large-scale information, a cellular phone memory and a Central Processing Unit (CPU), thereby severely restricting the application of the methods to current portable terminals.

The pre-processing step S410 in performing the character recognition, as shown in FIG. 4, includes processing the corresponding image in such a manner that even when the color of a character in a character image, to be recognized, is lighter than the background color of the character, the character can be recognized. In the above described step, although there may be differences between the kinds of character recognizers, a character recognizer may directly include the above described steps in its structure.

Figure 12A:
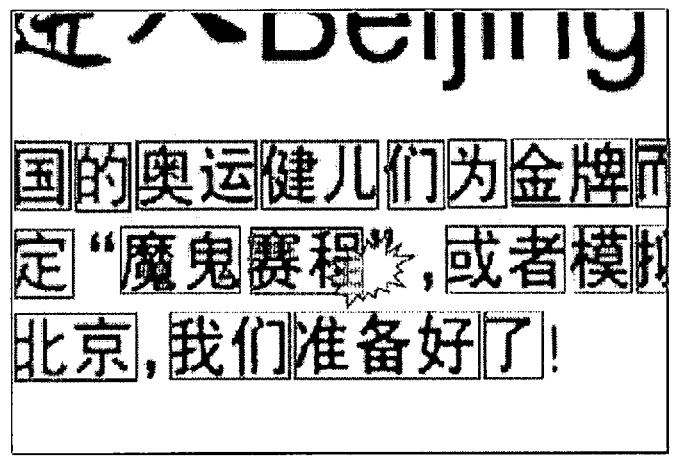
FIGS. 12A to 12C are views illustrating an example of a character image processed according to a second embodiment of the present invention.
Figure 12B:
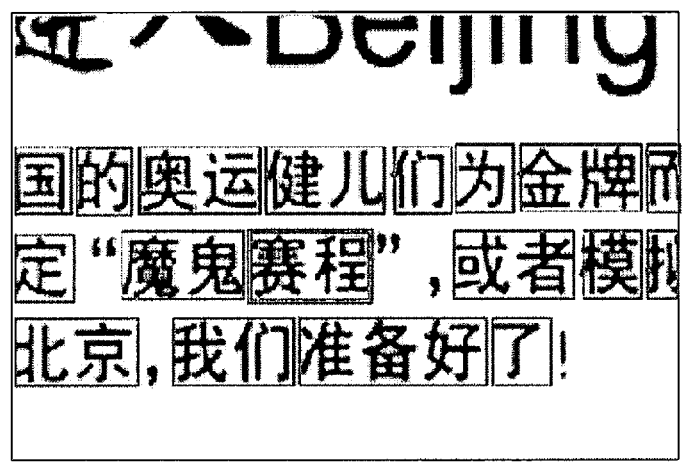
Figure 12C:
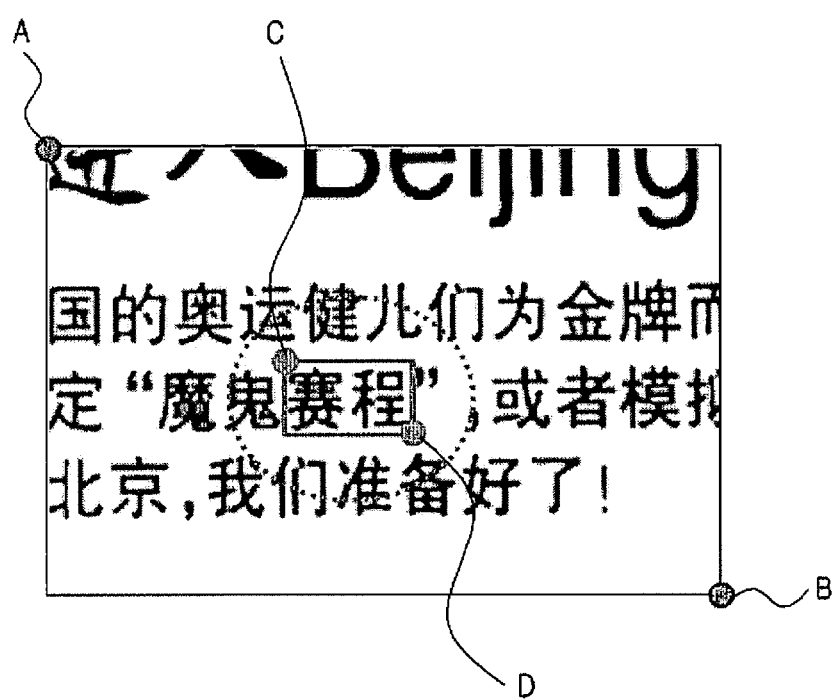
Figure 13A:
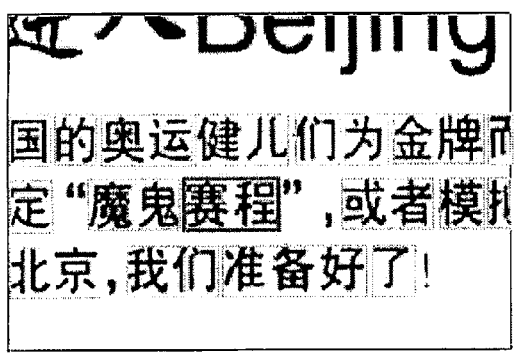
FIGS. 13A to 13D are views illustrating a character image according to methods for providing location information of a selected word to a user.
Figure 13B:
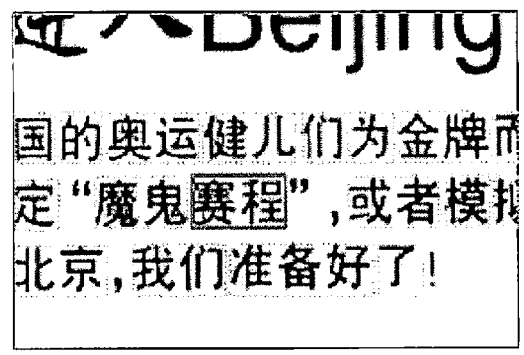
Figure 13C:
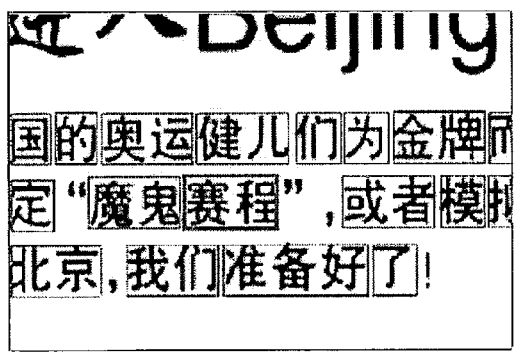
Figure 13D:
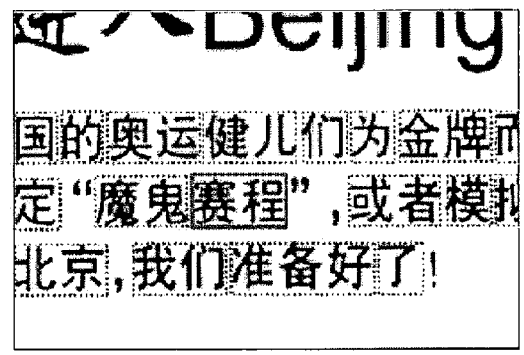

FIGS. 12A to 12C are views illustrating an example of a character image processed according to a method of selecting an electronic dictionary data search word by the user, according to an embodiment of the present invention. When the user selects the location as shown in FIG. 12A, from among candidate search words among showing their corresponding locations search on the screen, the corresponding candidate search word is selected as a search word while being provided to the user as result information from search translation in connection with the electronic dictionary database. Various techniques are used to easily distinguish the selected search words from other neighboring candidate search words. In such techniques, when the user does not directly select the location area of a corresponding word in selecting a search word from among candidate search words, the location (e.g., the square in FIG. 12B) of a candidate search word most adjacent to the user's selected location area on the screen is automatically calculated as shown in FIG. 12C, and is selectably shown.

FIGS. 13A to 13D are views illustrating a character image according to methods for providing location information of a selected word to a user.

Figure 14:
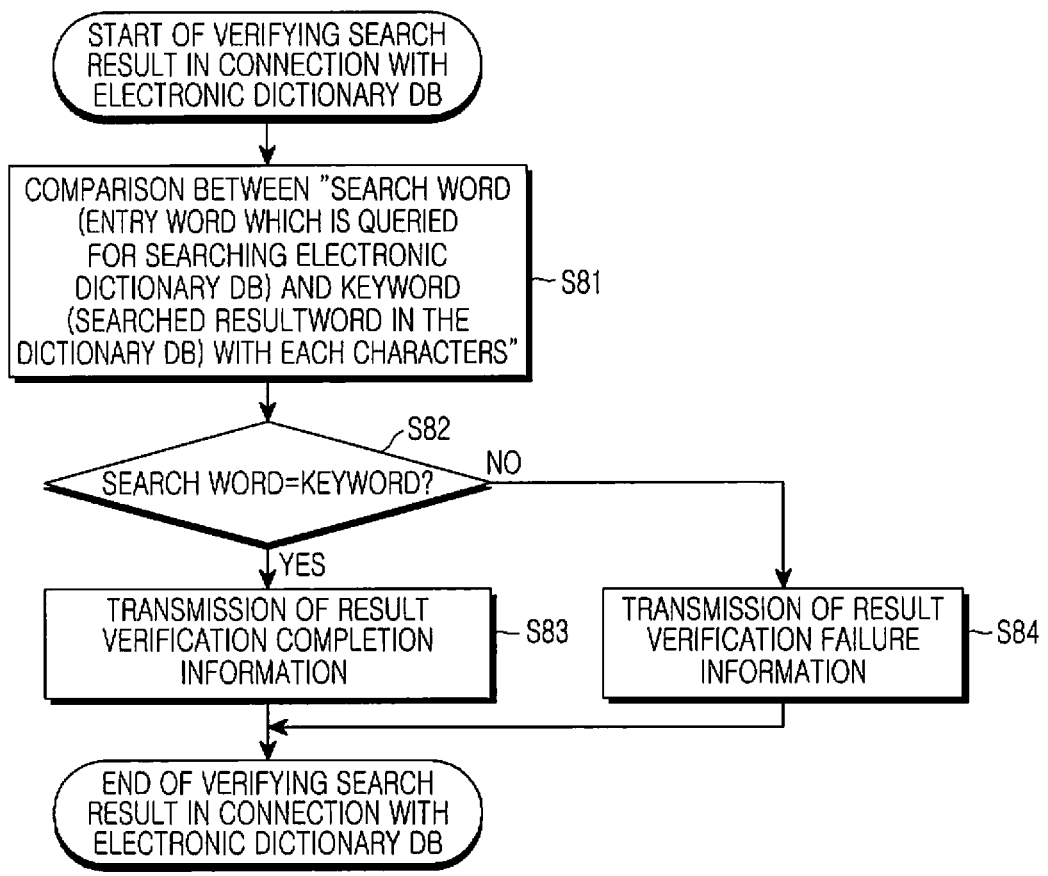
FIG. 14 is a flow chart illustrating a verification method for determining whether a search word selected by the user matches a searched electronic dictionary keyword or an entry word.

FIG. 14 is a flow chart illustrating a verification method for determining whether a search word selected by the user matches the searched electronic dictionary keyword or entry word. The verifying method is performed during the process of providing the result of the electronic dictionary search translation via the screen, for further verifying whether the user's selected search word and the corresponding electronic dictionary search result information (a dictionary entry word or keyword) match each other. When there is a possibility that the output result of the electronic dictionary, on a search word recognized and selected from the original character image, is wrong, the verifying method as shown in FIG. 14 allows the user to instinctively verify the wrong result. Especially, since the search function may operate differently according to various kinds of electronic dictionaries, a user (who does not know the corresponding language) may not know whether the provided information is accurate. However, through the verification method as shown in FIG. 14, it is possible to solve the above described problem.

Referring to FIG. 14, the verification method for determining whether a search word selected by the user matches the searched electronic dictionary keyword or entry word includes performing a comparison between a search word (i.e., an entry word that is queried for searching electronic dictionary DB) and a keyword (i.e., a searched result word in the dictionary DB) with each character, in step S81. In step S82, it is determined whether a search word corresponds to a keyword. In step S83, if the search word and keyword correspond, result verification completion information is transmitted In step S84, if the search word and keyword do not correspond, result verification failure information is transmitted.

Figure 15A:
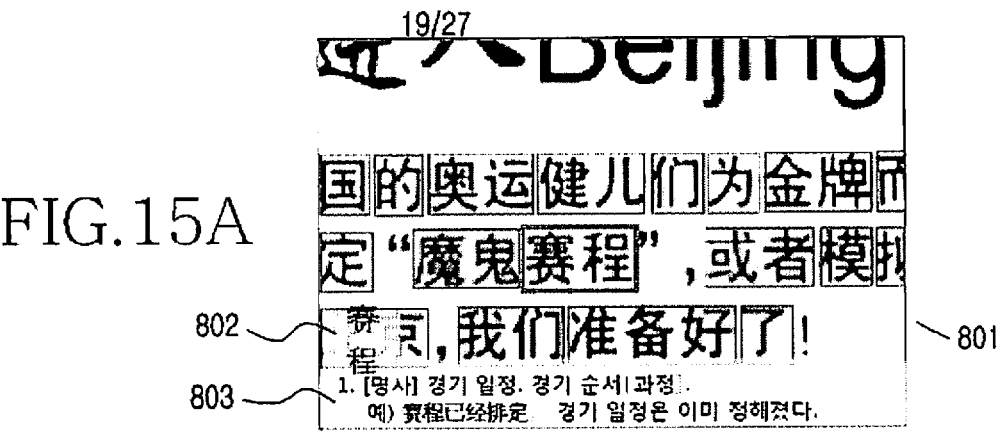
FIGS. 15A to 15D are views specifically illustrating an example of a screen display of an electronic dictionary DB search result of a search word selected by the user.
Figure 15B:
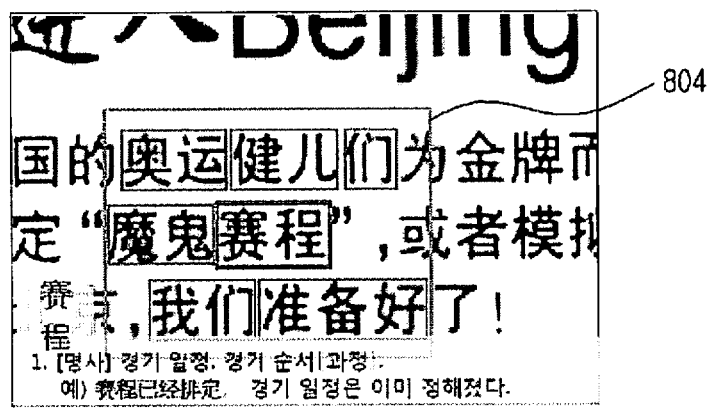
Figure 15C:
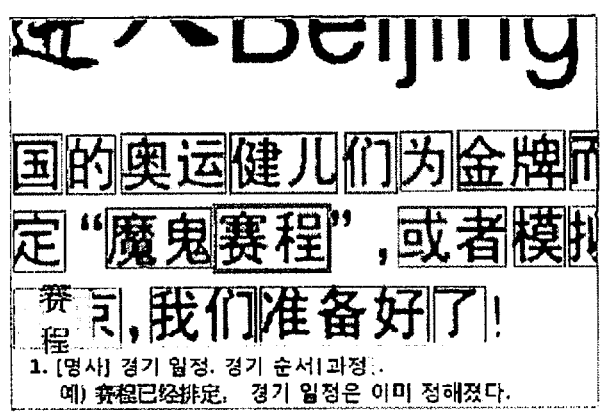
Figure 15D:
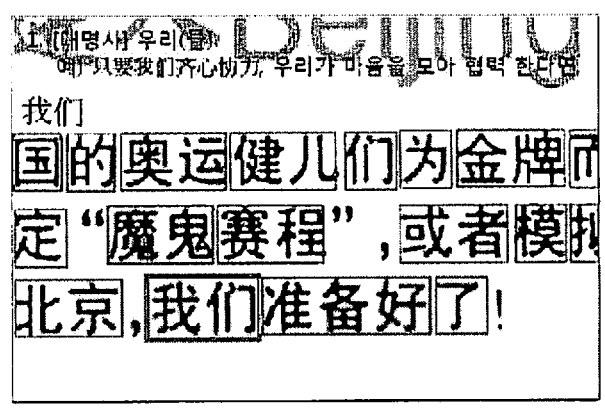

FIGS. 15A to 15D illustrate an example of a screen display of an electronic dictionary database search result of a search word selected by the user, which illustrates a method of displaying the result of the entire or partial area of the character image, on the screen. FIGS. 15A and 15B show screens displaying electronic dictionary database search results of the search word selected by the user, in which the screens provide the result of recognition of the entire or partial area of the character image. In FIG. 15A, a dictionary keyword (or an entry word, 802) searched from the electronic dictionary database is displayed with a semitransparent window, and the searched result 803 of the above mentioned dictionary keyword 802, with an additional semitransparent window, is also provided to the user. FIG. 15B shows the screen when the user selected only a part area 804 of the character image. FIGS. 15C and 15D show screens displaying electronic dictionary DB search results of the search word selected by the user, in which in FIG. 15C the result is displayed on the lower area of the screen, and in FIG. 15D, the result is displayed on the upper area of the screen.

FIG. 16 is a flow chart illustrating a method for recognizing and translating a character image, according to a third embodiment of the present invention. Referring to FIG. 16, a method for recognizing and translating a character image photographed by a camera attached to a portable terminal, and providing the result, according to a second embodiment of the present invention, includes the following steps. In step S21, a photographed image is stored and displayed on a screen. Step S22 includes providing the character image photographed by the camera to the user via the screen in such a manner that he can select the image. Step S23 includes recognizing characters included in an area to be recognized in the character image selected by the user in step S22, and storing the recognized individual characters. Step S24 includes selecting an area to be translated on the character image provided via the screen. Step S25 includes post-processing a character string included in the area selected in step S24, constructing candidate search words from individual characters included in the post-processed character string, and selecting a search word from among the candidate search words. Step S26 includes providing a result searched from an electronic dictionary database, which corresponds to the search word selected in step S25, to the user. Step S27 includes selectively operating or ending the electronic dictionary built in the portable terminal by the user. Steps S28 to S31 are similar to steps S811 to S814, respectively, of FIG. 8.

In step S22, the user directly selects a character image area to be recognized, from the character image displayed on the screen device, and the selected area is stored and displayed on the character image on the screen device in such a manner that the user can easily recognize the area. In step S23, for the character image area corresponding to the area displayed on the screen, the characters included in the character image are recognized, and information on the character strings resulting from the character image recognition is stored to output or store the recognized individual characters as a digital character data type. In step S24, the location information of the user's selected to-be-translated area on the character image displayed on the screen device is stored, and one character string, which is located closest to the corresponding location information and exists in a location including the previously recognized/stored character information, is selected.

In step S25, the one character string selected in step S24 is post-processed to filter out numbers or special characters, except for characters, included in the character string, and then for the post-processed character string, candidate search words for searching an electronic dictionary database are constructed by using the individual characters included in the character string. Then, from among the searched candidate search words, a final electronic dictionary database search word is selected. In step S26, on the character image displayed on the screen, definition information of a dictionary entry word or keyword of a result searched from the electronic dictionary database, corresponding to the selected electronic dictionary database search word, is directly provided, and in step S27, the selected electronic dictionary database search word is used as an electronic dictionary entry word or keyword so that the user selectively operates or ends the electronic dictionary built in the portable terminal. This method according to an embodiment of the present invention may provide an effective method of translation in connection with an electronic dictionary of Chinese and Japanese words, and also, in some languages having no spaces between meaning words (for example, Korean compound nouns), the electronic dictionary-based translation result of individual meaning words of the corresponding compound noun word may be provided to the user.

In this embodiment according to the present invention, it is possible to distinguish a search word to be actually translated by directly using the information from the electronic dictionary database built into the portable terminal, or other similar devices, and to obtain an accurate translation result by searching for the user's finally selected word in connection with the electronic dictionary database.

Figure 17:
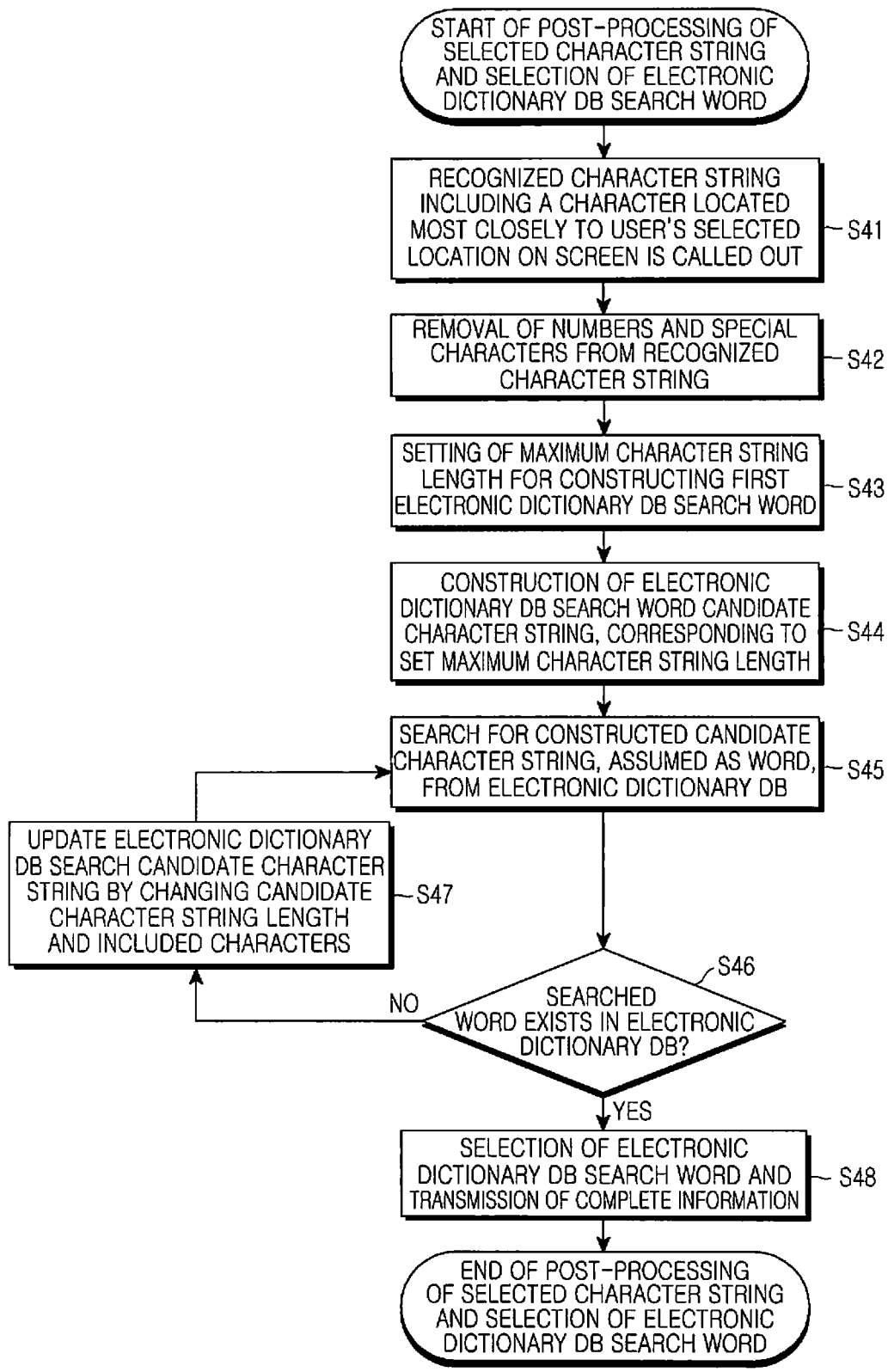
FIG. 17 is a flow chart illustrating an example of a method for selecting an electronic dictionary DB search word.

FIG. 17 is a flow chart illustrating step S25 of FIG. 16. Step S25 can be performed according to two kinds of methods. FIG. 17 corresponds to a first one of the two methods.

Step S25 includes setting, after the post-processing of a character string (whose location is selected by the user), a maximum character string length searchable from the electronic dictionary database, and constructing an electronic dictionary database candidate search character string including characters of the number of the maximum character string length, the characters starting from the left of the character corresponding to the user's selected location, in steps (d-1) (steps S41-S44); searching for the electronic dictionary database candidate search character string as a word, in connection with the electronic dictionary database, and determining whether or not the search result exists in the electronic dictionary database, in step (d-2) (steps S45-S46); updating, if the candidate search character string does not exist in the electronic dictionary database, the electronic dictionary database candidate search character string by changing the length of the candidate character string, and the characters included in the string, in step (d-3) (step S47); and searching for the updated electronic dictionary database candidate search character string, assumed to be a word, in connection with the electronic dictionary database, completing an electronic dictionary database search selection when there is an electronic dictionary database search result for the word-assumed character string, and providing the corresponding search result via the screen, in step (d-4) (step S48).

Step (d-1) includes calling out a recognition character string including the character located most closely to the user's selected location on the screen in step S41, removing numbers and special characters from the recognized character string in step S42, setting the maximum character string length to construct a first word for an electronic dictionary database search in step S43, and constructing an electronic dictionary database candidate search character string corresponding to the set maximum character string length in step S44.

Step (d-2) includes searching for the candidate search character string, assuming it is a word, from the electronic dictionary database in step S45, and determining whether the searched word exists in the electronic dictionary database in step S46. After steps S45 to S47 are repeatedly performed, the information about the completion of the selection of the electronic dictionary database search word is transmitted, in step S48.

Figure 19A:
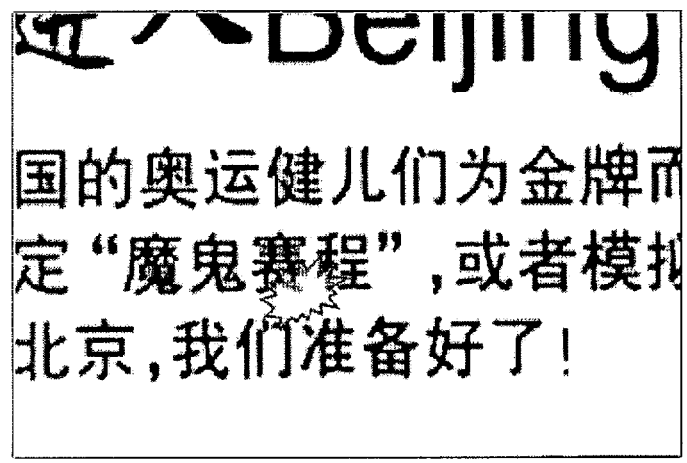
Figure 19B:
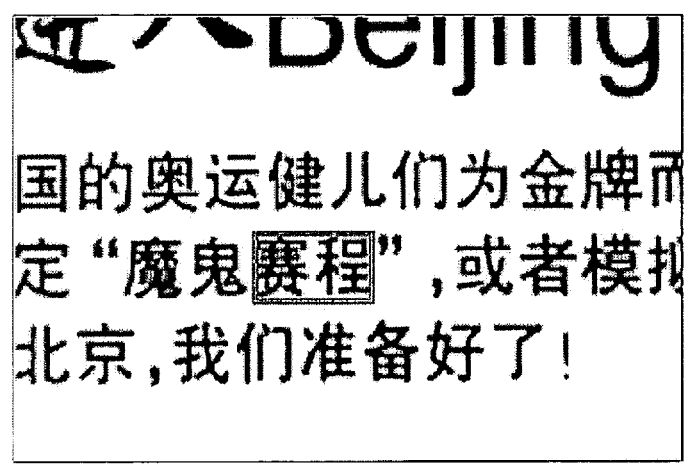

FIGS. 19A to 19B and 20A to 20G are views illustrating the post-processing of the recognized character string and a method of selecting an electronic dictionary database search word based on FIG. 17. FIG. 19A illustrates an example of a screen, in which each character to be searched from an electronic dictionary database is selected from the character image displayed on the screen, and FIG. 19B illustrates an example of a screen, in which the location information of an electronic dictionary database search word is displayed on the character image. FIGS. 20A to 20F illustrate examples of word-labeling on a post-processed character string by using an electronic dictionary data entry word, and FIG. 20G illustrates an example of selecting the word of the user's selected location area, from among the labeled words, as an electronic dictionary database search word.

Figure 18:
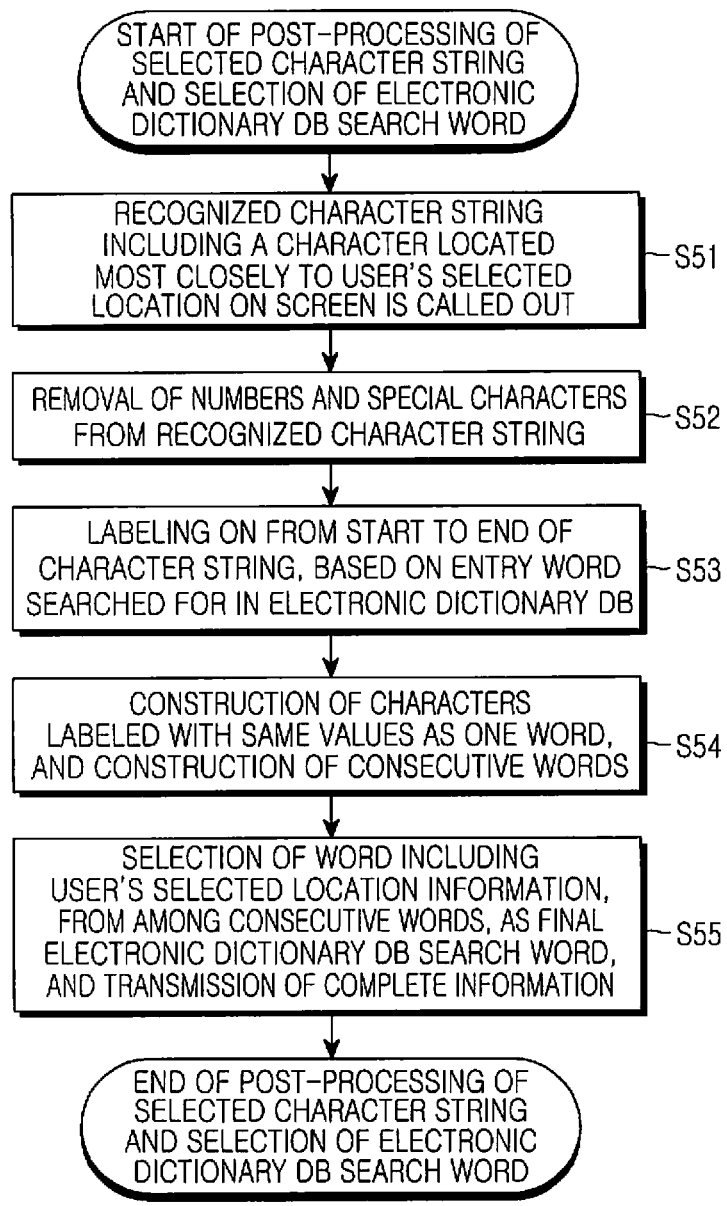
FIG. 18 is a flow chart illustrating another example of a method for selecting an electronic dictionary DB search word.

FIG. 18 is a flow chart for illustrating a second method for performing step S25 in FIG. 16. The method as shown in FIG. 18 is different from the method as shown in FIG. 17, in that it uses, instead of the location of the user's selected specific individual character, the entire corresponding character string including the location information of the individual character.

In other words, for the entire corresponding character string including the location of the user's selected character, words constituting the corresponding character string are separated by using the information on a dictionary entry word or keyword of electronic dictionary database built in the portable terminal, and from the separated words, a word including the individual character of the user's first selected location area is selected as an electronic dictionary search word. Specifically, the method illustrated in FIG. 8 includes calling out a recognition character string including the character located most closely to the user's selected location on the screen, in step S51, removing numbers and special characters from the recognized character string in step S52, labeling the first to last of the character string based on an entry word searched from the electronic dictionary database, in step S53, constructing consecutive words by constructing the same-value labeled characters as one word in step S54, and selecting, from among the consecutive words, a word including the user's selected location information as a final electronic dictionary database search word, and transmitting completion information, in step S55.

Figure 21A:
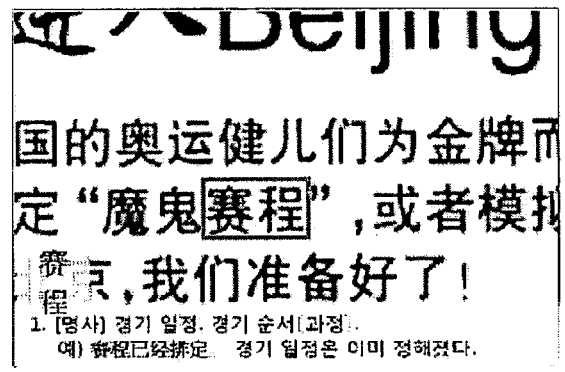
FIGS. 21A to 21D are views illustrating a difference between entire recognition and partial recognition of a character image, while providing an electronic dictionary DB search result.
Figure 21B:
Figure 21C:
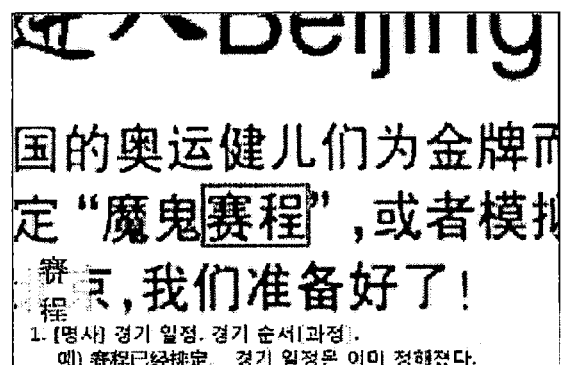
Figure 21D:
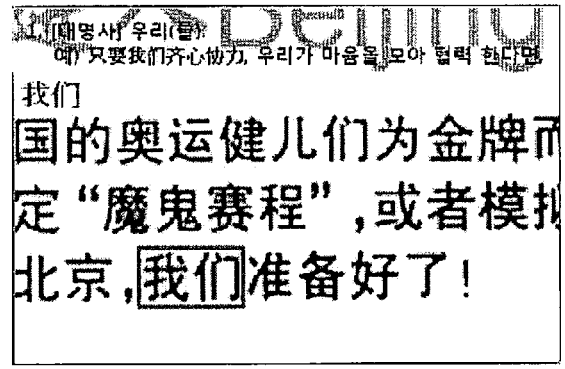

FIGS. 21A to 21D illustrate examples of actual photographs, in which in a method of displaying the electronic dictionary database search result on the user's selected search word, the entire or part of the character image is selected. FIG. 21A illustrates a result when an entire character image is recognized, and FIG. 21B illustrates the result from a partial area (a solid line) selected by the user. FIGS. 21C and 21D illustrate an example of automatically and vertically adjusting a location of a display displaying a translation result according to user's selected location of the word for search translation in a screen.

Figure 22:
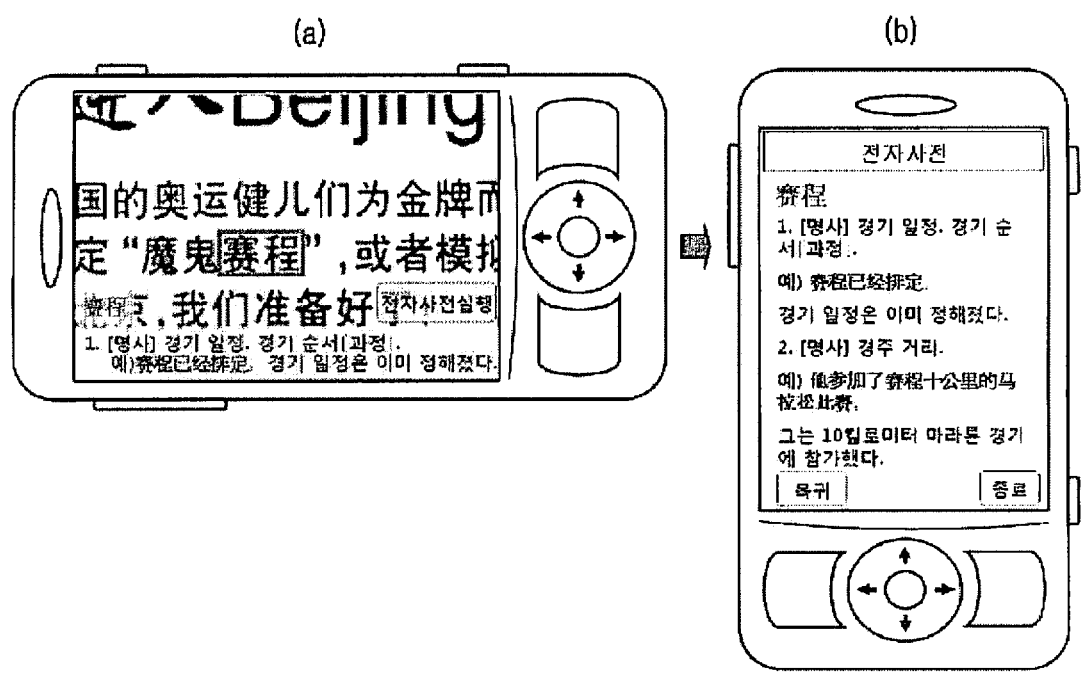
FIGS. 22A and 22B are views illustrating images on a display screen built into a portable terminal corresponding to a method of operating an electronic dictionary according to the present invention.

FIGS. 22A and 22B show a screen to which a dictionary-connected translation result on an electronic dictionary database search word including characters recognized from the character image is provided, and FIG. 23 illustrates a method and example of directly operating the electronic dictionary built in the portable terminal to obtain more specific translation result information. FIG. 22A is an example of providing a translated result over the character image, and FIG. 22B is an example of providing a specific result on a word from the electronic dictionary.

FIG. 23 illustrates a process of operating an electronic dictionary, the process including selecting a menu for operating an electronic dictionary, the storage of an electronic dictionary database search word in a temporary memory, transferring the electronic dictionary database search word to an electronic dictionary interface, and converting the electronic dictionary database search word into a dictionary keyword concurrently with the operation of the electronic dictionary.

While the invention has been shown and described with reference to certain embodiments thereof, it will be understood by those skilled in the art that various changes in form and details may be made therein without departing from the spirit and scope of the invention. Therefore, the spirit and scope of the present invention must be defined not by the described embodiments thereof but by the appended claims and equivalents of the appended claims.

What is claimed is:

1. A method for recognizing a character string or a word included in a character image photographed by a camera, and translating a recognized specific character string or word to another language by using a built-in electronic dictionary DataBase (DB), the method comprising:

recognizing the character string or word in the photographed character image, wherein a character string or words included in a character image area selected by a user is recognized and the recognized character string is post-processed; and performing an electronic dictionary-connected search and translation, wherein a character or a word selected by the user, from among the words included in the character string which has been recognized and post-processed, is searched in connection with the electronic dictionary DB, and translation result information of the searched word is displayed on a screen device;

wherein recognizing the character string or word comprises user interfacing, in which information on location of the selected character image area and location of the recognized character string words is provided to the user, and then a character string or word in a location area selected by the user is to be translated, and wherein performing the electronic dictionary-connected search and translation is for searching the character or word selected in the user interfacing step in connection with the electronic dictionary DB, and providing a translation result to the user through the user interfacing.

2. The method as claimed in claim 1, wherein user interfacing comprises:

(a) directly displaying, in selecting a recognition object area range for character image recognition after displaying the character image photographed by the camera on the screen device, location of a recognition area, which is being selected or has been selected, over the character image displayed on the screen device, so as to allow the user to instinctively verify a selection step and result;

(b) directly displaying relative location information of the recognized words over the character image so as to determine whether the word that the user wants to translate, is recognized, from a corresponding character recognition result of a recognized character image area; and (c) directly displaying a word at a location selected by the user, from among a plurality of recognized words included in the recognized character image area, and corresponding translation information searched from the electronic dictionary DB, over the character image displayed on the screen device, wherein user interfacing provides a connection function of the character image with the electronic dictionary DB.

3. The method as claimed in claim 2, wherein user interfacing further comprises:

(d) determining whether another character or word other than the user's first selected character or word is selected, and then returning to step (c) if the user selects another character or word; and (e) receiving, from a user, input of a determination, if the user does not select the recognized character or word, of whether to return to the step (a).

4. The method as claimed in claim 2, wherein in step (a), when the user selects an entire photographed image as a character recognition area, a recognition and translation of the character or word is performed.

5. The method as claimed in claim 2, wherein post-processing the recognized character string comprises:

filtering out special characters or numbers from the recognized character string;

constructing a word from recognized individual characters, and searching connected dictionary data for the constructed word to verify a dictionary meaning; and providing the recognized character or word to the user via step (c).

6. A method for recognizing and translating a character string or words included in a character image obtained by camera-photographing a subject comprising a character, and providing a result to a user via a screen device, the method comprising the steps of:
- (a) providing a user interface, wherein the user directly selects an area to be recognized in the photographed character image, and can in real-time confirm information of the selected area;
- (b) recognizing characters and storing recognized characters included in the area selected by the user;
- (c) post-processing, from among characters or character strings recognized in step (b), a character string, which exists on a location comprising a character or a word located at the user's selected area in the character image displayed on the screen device, by filtering out special characters or numbers, and then separating the character string into selectable words by using words in an electronic dictionary DataBase (DB) and temporarily storing result information;
- (d) searching for, from words temporarily stored in step (c), a word located in the user's first selected area in connection with the electronic dictionary DB, and verifying a result; and
- (e) providing a translation result of the word verified in step (d) to the user.

7. The method as claimed in claim 6, wherein step (a) is performed by using a drag of a touch screen, or a pointing device such as a mouse.

8. The method as claimed in claim 6, wherein step (b) includes recognizing the characters included in the user's selected area, and then storing a recognition result as individual characters and location information of the individual characters, words comprising the individual characters and location information of the words, lines comprising the words and location information of the lines, blocks comprising a series of lines and location information of the blocks, and a series of blocks and location information of the series of blocks.

9. The method as claimed in claim 6, wherein step (d) includes providing location information of the user's selected word with respect to the character image to the user, which is overlapped on the screen device providing the character image in a pre-recognition state, with a highlighting marker wrapping a corresponding word, and
wherein when the user selects only a part of the entire character image, location information of a word or characters included in location information of only an area selected by the user is provided.

10. The method as claimed in claim 6, wherein in step (d) if the user does not accurately select location of a word to be actually translated, a distances between the user's selected location and locations of recognized words are calculated, and a word located closest to the user's selected location is translated in connection with the electronic dictionary.

11. The method as claimed in claim 6, wherein when a language to be translated has no space between words, step (c) comprises:
loading data of all character strings stored after recognizing characters of the character image;
filtering out numbers or special characters included in the loaded character strings;
comparing the filtered character strings with the electronic dictionary DB, and separating searched words; and
searching for words from among the separated words that are directly selected by the user via the screen device, in connection with the electronic dictionary DB.

12. The method as claimed in claim 6, wherein in step (e), the translation result is provided in a semi-transparent type allowing other image information to be shown to the user, and if the result overlaps a previous search result, the search result is provided to the user via the screen device in such a manner that the result does not overlap the previous search result.

13. The method as claimed in claim 6, further comprising:
- (f) operating the electronic dictionary DB after step (e);
- (g) determining whether to return to the screen device providing the translation result from the state where the electronic dictionary DB is operating in step (f);
- (h) determining whether another word to be translated is selected;
- (i) determining whether another area to be recognized in the character image is selected, if another word to be translated is not selected in step (h); and
- (j) determining whether to recognize another character image if another unrecognized area in the character image is not selected in step (i),
wherein in step (f), a means with which the user directly operates the electronic dictionary DB is provided to the user via the screen device, and then when the operating means is selected, an operating state of the electronic dictionary DB is displayed on the screen device.

14. The method as claimed in claim 6, wherein step (d) comprises:
sequentially, after post-processing the character string at the user's selected location, searching for a first character to a last character of the character string in connection with an entry word or keyword of the electronic dictionary DB built in a portable terminal, and then obtaining candidate words to be selectable as a final electronic dictionary DB search word and separately storing the candidate words; and
selecting, from among a plurality of the stored candidate words, a candidate word comprising location information corresponding to the user's first selected location, as the final electronic dictionary DB search word.

15. The method as claimed in claim 14, wherein in a character string of languages having no space between individual words, constructing an electronic dictionary DB search word for use in a search comprises:
selecting a maximum length of a candidate character string to be firstly used for searching the electronic dictionary DB, while taking frequencies of lengths of words of a corresponding language into consideration; and
updating, when the candidate character string of the electronic dictionary DB search word does not exist in the electronic dictionary DB, the candidate character string of the electronic dictionary DB search word by reducing a length of the candidate character string and correspondingly reducing a number of characters included in the included character string.

16. The method as claimed in claim 11, wherein the language is one of Chinese and Japanese.

17. The method as claimed in claim 15, wherein the language is one of Chinese and Japanese.

\* \* \* \* \*